United States Patent Office 3,535,593
Patented Oct. 20, 1970

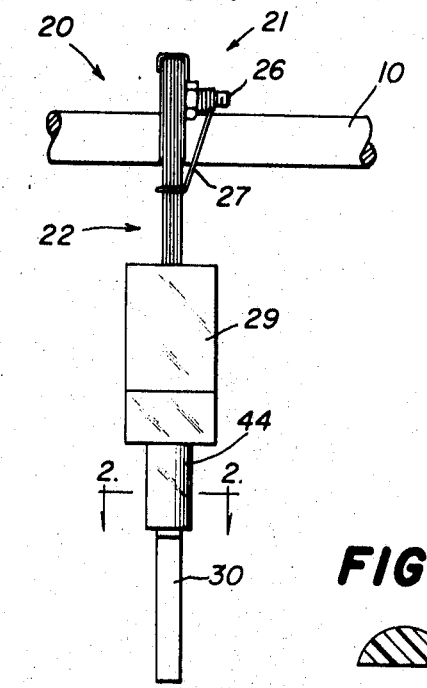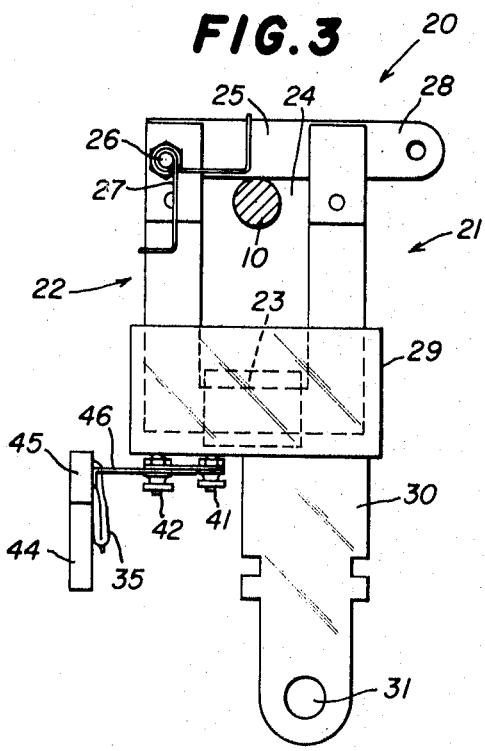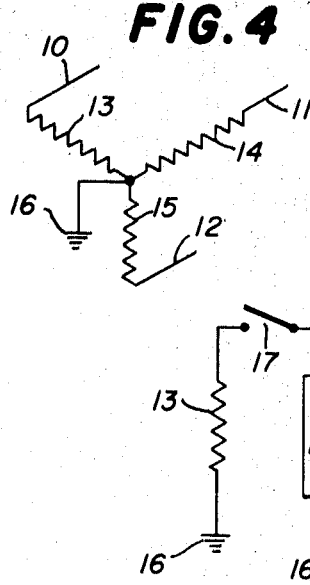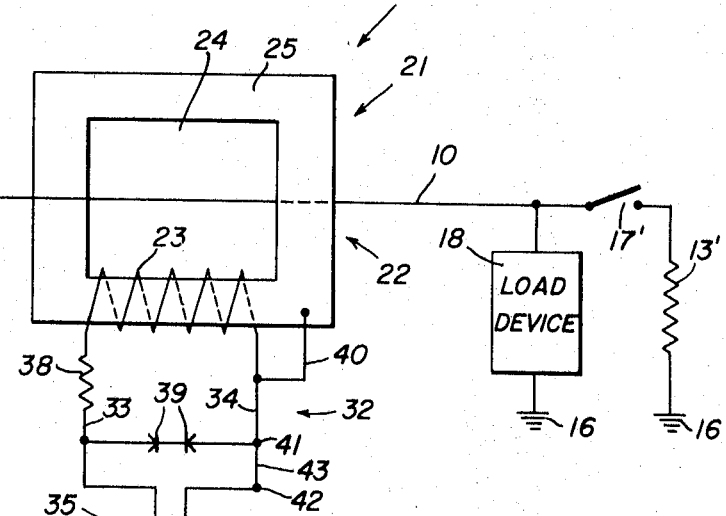

3,535,593
POWER FLOW DIRECTION RESPONSIVE MEANS FOR ALTERNATING CURRENT CIRCUIT
Edmund O. Schweitzer, Jr., 1002 Dundee Road, Northbrook, Ill. 60062
Filed Mar. 28, 1968, Ser. No. 716,884
Int. Cl. H02h 3/18
U.S. Cl. 317—39                                            28 Claims

ABSTRACT OF THE DISCLOSURE

The direction of power flow in an alternating current circuit is determined and utilized to provide an indication of the same and to operate indicating and/or switching devices in accordance therewith.

---

Figure 6:
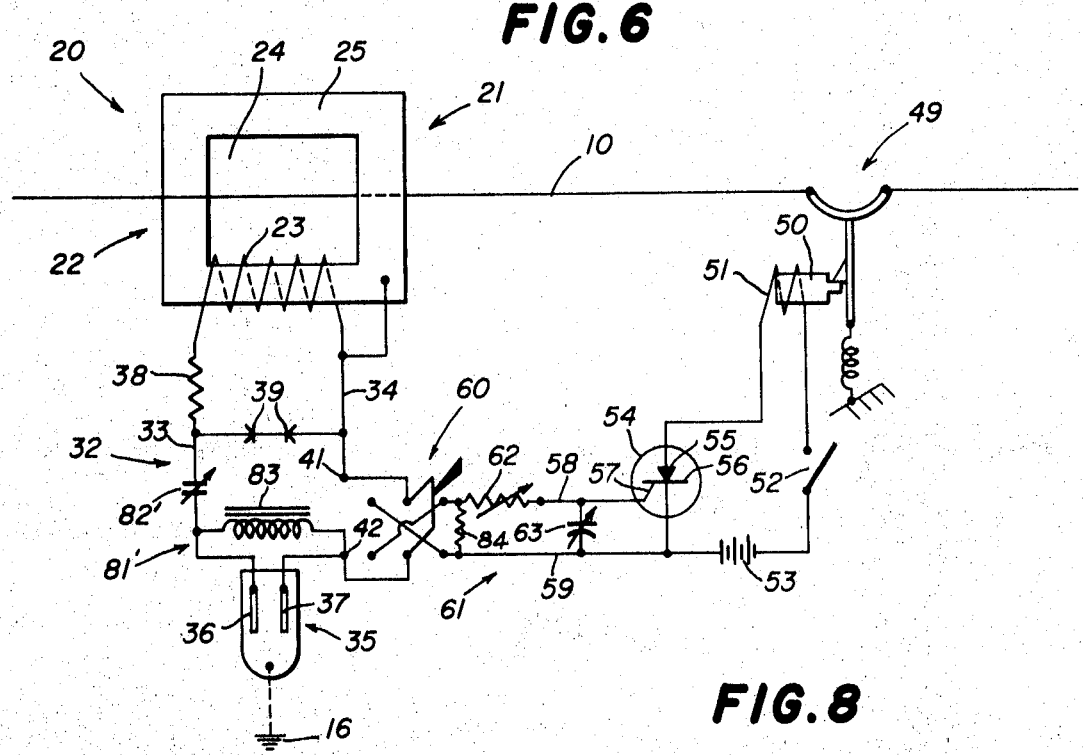

Among the objects of this invetnion are: To provide a simple and reliable direction of alternating current power flow indicator and relay operable by induction from the magetic field and the electric field of the power line or conductor, thereby requiring no direct connection thereto; to employ for this purpose a device, such as a glow lamp or tube, to cause direct current to flow in a circuit in one direction or the other depending on the direction of alternating power flow in the conductor; to indicate the direction of power flow by the selective glowing of the electrodes; to operate the glow tube in response to the combined action of the electric and magnetic fields about the conductor; to provide for magnifying the electrodes to increase the visibility thereof; to link the alternating current carrying conductor with a magnetic circuit having a winding linking it that is connected to a circuit including the glow tube; to position the electrodes of the glow tube in series with respect to the voltage generated in the winding by the magnetic field and in parallel with respect to the electric field about the conductor; to arrange for manipulation of the magnetic circuit and parts associated therewith with respect to the high voltage alternating current conductor by a live line tool; to limit the voltage applied to the electrodes of the glow tube from the winding; to utilize the flow of direct current through the glow tube for effecting remote operation of devices such as relays, circuit interrupters and indicating lamps; to trip a circuit interrupter connected in series with the conductor on reversal of flow of alternating current power therein; and to indicate at a remote point the direction of alternating current power flow in a conductor.

According to this invention, a magnetic circuit links an alternating current carrying conductor in which the power flow may be in one direction or the other corresponding to a 180° shift in the relation between the voltage at which the conductor is energized with respect to ground or another conductor and the current flow in the conductor. Advantage is taken of the combined action of the electric and magnetic fields about the conductor to cause direct current to flow in a circuit in one direction or the other according to the direction of power flow. The circuit is energized from a winding on a magnetic core linking the conductor and includes a gas filled glow tube which is positioned to be subject to the electric field of the conductor. The circuit includes a series connected current limiting resistor. Back to back connected Zener diodes across the circuit maintain the glow tube at or slightly below its discharge voltage and independent of the magnitude of the current flow in the winding or in the conductor. One or the other of the electrodes glows and direct current flows in the circuit in one direction or the other according to the direction of power flow in the conductor. Advantage is taken of this flow of direct current in the circuit to operate relays, trip a circuit interrupter connected in series with the conductor, and to indicate at a remote point the direction of power flow.

Figure 7:
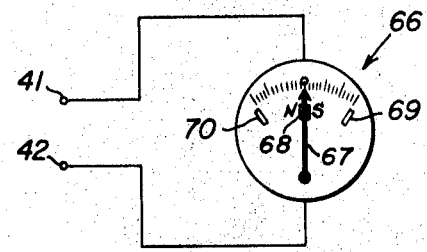
Figure 8:
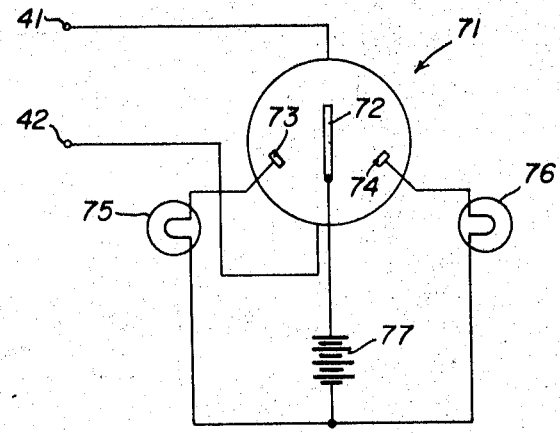
Figure 9:
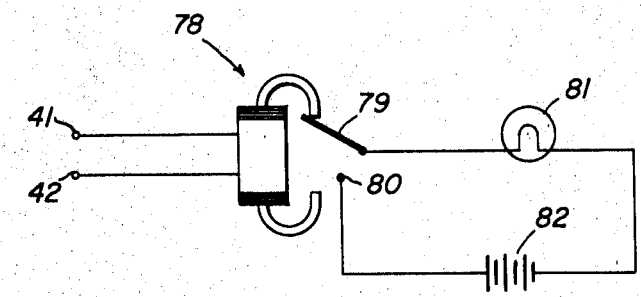

In the drawings: FIG. 1 is a view, in end elevation, of power flow direction responsive means in which this invention is embodied and illustrating its application to a high voltage conductor. FIG. 2 is a horizontal sectional view taken generally along the line 2—2 of FIG. 1 to show the construction of the lens. FIG. 3 is a view, in side elevation, of the power flow direction responsive means illustrated in FIG. 1, the conductor being shown in section. FIG. 4 illustrates, diagrammatically, a polyphase alternating current circuit which is typical of the circuits with which this invention can be employed. FIG. 5 illustrates, diagrammatically, the application of this invention to an alternating current circuit. FIG. 6 is a view, similar to FIG. 5, and shows how the power flow direction responsive means can be employed for controlling the operation of a circuit interrupter connected in series with the conductor. FIGS. 7, 8 and 9 illustrate, diagrammatically, various signaling arrangements that can be employed in response to reversal of flow of direct current in a circuit forming a part of the power flow direction responsive means to indicate the direction of power flow in the conductor.

In FIG. 4 a conventional three phase circuit is illustrated employing conductors 10, 11 and 12 that are arranged to be energized from windings 13, 14 and 15 which are commonly connected to ground at 16. The windings 13, 14 and 15 may be the windings of a polyphase generator or the windings of a polyphase transformer having other windings inductively related thereto. Since the conductors 10, 11 and 12 may be connected at their other ends to a similar source of alternating current power, it is desirable that provision be made for indicating the direction of power flow in the conductors 10, 11 and 12.

For this purpose the power flow direction responsive means shown in FIGS. 1, 2, 3 and 5 can be employed. Referring first to FIG. 5, it will be observed that the conductor 10 is arranged to be connected by a switch 17 to power source or winding 13 which is grounded at 16. Also, a switch 17′ is arranged to connect the conductor 10 for energization to a power source or winding 13′ which is grounded at 16. For illustrative purposes it is pointed out that, when switch 17 is closed and switch 17′ is open, a load device, connected between the conductor and ground 16, is arranged to be energized. In that case alternating current power flows from left to right through the conductor 10 to the load device 18. When switch 17 is open and switch 17′ is closed, alternating current power flows from source 13′ over conductor 10 to load device 18′ or from right to left. Of course it will be understood that the load devices 18 and 18′ are energized in parallel and that alternating current power will flow in one direction or the other in the conductor 10, depending upon whether the switch 17 or the switch 17′ is closed.

With a view to obtaining an indication of the direction of flow of alternating current power in the conductor 10, power flow direction responsive means, indicated generally at 20, is employed. The power flow direction responsive means 20 includes a magnetic circuit that is indicated, generally, at 21. The magnetic circuit 21 is arranged to link the conductor 10 and includes a U-shaped section 22. A winding 23 links the U-shaped section 22. Between the ends of the arms of the U-shaped section 22 there is an air gap 24 that is arranged to be shunted by a magnetic shunting member 25 which acts in the manner of a conventional switch blade for interconnecting the distal ends of the arms of the U-shaped section 22. The magnetic shunting member 25 is pivoted at 26, FIGS. 1 and 3, and a spring 27 is arranged to bias the magnetic shunting member 25 to the position here shown. An extension 28 of the magnetic shunting member 25 is arranged to engage the conductor 10 so that, when the power flow direction responsive means 20 is moved bodily with respect to the conductor 10, the magnetic shunting member 25 is opened to permit the conductor 10 to be positioned in the air gap 24. Then the spring 27 returns the magnetic shunting member 25 to the position shown in FIGS. 1 and 3.

The lower end of the U-shaped section 22 of the magnetic circuit 21 and the winding 23 are encapsulated by suitable plastic insulation as indicated at 29. An arm 30 depends from the encapsulation 29 and is attached integrally thereto. The arm 30 contains an eye 31 to receive a hook of a live line tool for manipulating the power flow direction means 20 into or out of engagement with the conductor 10.

It will be understood that a voltage is generated in the winding 23 on flow of current in the conductor 10 as the result of the magnetic field generated around the conductor 10 and induced in the magnetic circuit 21. Likewise, due to the fact that the flow of current in the conductor 10 is the result of the application of alternating voltage between it and ground 16, an electric field exists between the conductor 10 and ground 16. As will appear hereinafter, advantage is taken of the relationship between the magnetic and electric fields for providing an indication of the direction of flow of alternating current power in the conductor 10.

As illustrated in FIG. 5 a circuit, indicated generally at 32, is connected to be energized by the winding 23. The circuit 32 includes conductors 33 and 34.

Connected between the conductors 33 and 34 of the circuit 32 is a power flow indicator in the form of a gas filled glow lamp or tube that is indicated, generally, at 35. The glow lamp or tube 35 may be filled with neon and it includes electrodes 36 and 37. The electrodes 36 and 37 are connected to conductors 33 and 34 with the result that a voltage is applied thereto which is the result of the voltage induced in the winding 23 by the magnetic field generated about the conductor 10 and induced in the magnetic circuit 21. Also, the glow lamp or tube 35 is positioned, as shown in FIG. 3, to be located in the electric field of the conductor 10 and between it and ground 16. Alternatively, the glow lamp 35 can be located in the electric field between the conductors 10 and 11, for example.

In order to control the energization of the electrodes 36 and 37 a current limiting resistor 38 is connected in series with conductor 33. Zener diodes 39 are connected back to back between the conductors 33 and 34 to maintain the glow lamp or tube 35 at or slightly below its discharge voltage and independent of the magnitude of the current flow in the conductor 10. A connection 40 is arranged to place the conductor 34 at the same potential as the magnetic circuit 21. The conductor 34 includes terminals 41 and 42 that are connected by a link 43 for a purpose that will be apparent presently.

Since the glow lamp or tube 35 is relatively small and the spacing between the electrodes 36 and 37 is relatively close, it is desirable to magnify them in order to permit greater visibility thereof. The lens 44, FIGS. 1, 2 and 3, is located in front of the glow lamp or tube 35 and the assembly is carried by a support 45 of plastic or other insulating material which, in turn, is provided with laterally extending connectors 46, one to terminal 42 and the other to a terminal (not shown) of the conductor 33.

In describing the operation of the power flow direction responsive means 20, it will be assumed in FIG. 5 that the switch 17' is open and the switch 17 is closed. Power flow then is from left to right. Since the power flow direction responsive means 20 is located between the load devices 18' and 18, it is responsive only to the flow of alternating current power to the load device 18. The glow lamp or tube 35 is characterized by having one or the other of the electrodes 36 or 37 glowing, depending upon the direction of alternating current power flow in the conductor 10.

More specifically, the negative or cathode electrode glows while the positive or anode electrode remains dark. If the glow lamp or tube 35 were subjected only to the alternating voltage induced in the winding 23, then the electrodes 36 and 37 would glow alternately during the respective half cycles of the alternating current. If the electrodes 36 and 37 were subject only to the electric field between the conductor 10 and ground 16, they would glow simultaneously on that half cycle during which both are induced negatively. The combined effects of the electric field and the voltage induced in the winding 23 by the magnetic field result in causing only one of the electrodes, for example the electrode 37, to glow when the power flow is as assumed to be from left to right.

Now, assuming that the switch 17 is opened and the switch 17' is closed to energize the load device 18' from the power source 13', the flow of alternating current power in the conductor 10 is the reverse of that previously described with the result that the phase relation between the voltage generated by the winding 23 and the voltage due to the electric field is reversed or shifted approximately 180°. As a result the electrode 36 glows while the electrode 37 of the glow lamp or tube 35 remains dark. Thus it is possible by inspection of the electrodes 36 and 37 to determine whether alternating current power is flowing from left to right or right to left in the conductor 10. This arrangement is typical of the arrangement that can be provided for the other conductors 11 and 12.

It will be observed that the electrodes 36 and 37 are in series with respect to the voltage induced in the winding 23 by the magnetic field that is generated around the conductor 10 as the result of flow of alternating current therein. The electrodes 36 and 37 are in parallel with respect to the electric field between the conductor 10 and ground 16. Since one or the other of the electrodes 36 or 37 is positive while the other is negative, it follows that direct current flows in the conductors 33 and 34 forming the circuit 32 in one direction or the other, depending upon the direction of the flow of alternating current power in the conductor 10.

In FIG. 6 a circuit interrupter, shown generally at 49, is connected in series with the conductor 10. The power flow direction responsive means 20 is arranged to effect the opening of the circuit interrupter 49 on flow of alternating current power in the conductor 10 in one direction or the other. For this purpose an armature latch 50 is arranged to hold the circuit interrupter 49 in the closed position. A trip coil 51 is employed on closure of a switch 52 for attracting the armature 50 when energized from a battery 53 on the rendering conducting of a silicon controlled rectifier that is indicated, generally, at 54. The silicon controlled rectifier 54 includes an anode 55 which is connected to one terminal of the trip coil 51 and a cathode 56 which is connected to one terminal of the battery 53. A gate 57 is arranged to control the operation of the silicon controlled rectifier 54. For this purpose the circuit 32, comprising the conductors 33 and 34, is arranged to be connected to conductors 58 and 59, the former being connected to the gate 57 and the latter to the cathode 56. It will be observed that the link 43 is removed from the terminals 41 and 42 and that a reversing switch, indicated generally at 60, is arranged to selectively interconnect the terminals 41 and 42 to the conductors 58 and 59. By positioning the reversing switch 60 in one position, it is possible to effect the tripping of the circuit interrupter 49 on flow of alternating current power in one direction in the conductor 10 and to effect a tripping thereof when the alternating current power flow is in the reverse direction by changing the position of the reversing switch 60. A time delay means, indicated generally at 61, is interposed in the circuit to the silicon controlled rectifier 54. It includes a variable resistor 62 and a variable capacitor 63. Thus, if the reversal of alternating current power flow in the conductor 10 is only momentary, the circuit interrupter 49 will not be tripped. However, if the reversal of power flow extends for a predetermined time as determined by the time delay means 61, then the silicon controlled rectifier 54 is rendered conducting and the circuit interrupter 49 is operated to interrupt the flow of alternating current power in the conductor 10.

Instead of energizing a device, such as the trip coil 51 of the circuit interrupter 49, the arrangement shown in FIG. 6 can be employed for energizing other devices. For example, it can be employed for energizing a radio transmitter as outlined in Schweitzer et al. U.S. Pat. 3,348,099, issued Oct. 17, 1967, which in turn can be employed for effecting the operation of a radio receiver to perform selected functions, such as the operation of signaling apparatus, opening circuit interrupters and the like. Further, the winding 51 can be the winding of a buzzer or a light signaling device such as an indicating lamp.

In FIG. 7 there is illustrated, generally, at 66 a zero center device, such as a zero center galvanometer, that is connected for energization to the terminals 41 and 42. The pointer 67 is arranged to swing from the zero position in one direction or the other, depending upon the direction of flow of direct current in the circuit 32. In order to maintain an indication of the direction in which the flow of alternating current power in the conductor 10 has taken place a permanent magnet 68 is mounted on the pointer 67. At its right or left positions the permanent magnet 68 is arranged to engage keeper 69 or 70 to hold the pointer 67 in one or the other position, depending upon the direction of flow of direct current in the circuit 32. Where the power flow in the conductor 10 normally is in one direction, then the keeper 69 or 70 corresponding to that direction can be omitted with the result that, when the flow of alternating current power in the conductor 10 is reversed, the pointer 67 will shift to the opposite position where the permanent magnet 68 is attracted to the keeper 69 or 70 and provides a definite indication as to the reversal of the direction of power flow in the conductor 10. Subsequently the pointer 67 is manually restored to the zero center position.

In FIG. 8 a contact making zero center device is shown, generally, at 71 and connected for energization to the terminals 41 and 42 of the circuit 32. The device 71 can be a zero center galvanometer movement with a movable contact 72 arranged to engage either stationary contact 73 or stationary contact 74, depending upon the direction of direct current flow in the circuit 32. Indicating lamps 75 and 76 are connected to the stationary contacts 73 and 74 and are commonly connected to a battery 77 which is connected to the movable contact 72. On energization of the system one or the other of the indicating lamps 75 or 76 is energized, depending upon the direction of flow of alternating current power in the conductor 10.

In FIG. 9 a polarized relay is indicated, generally, at 78 and is arranged to be connected to the terminals 41 and 42. The relay 78 includes a movable contact 79 and a stationary contact 80. The arrangement is such that as long as the flow of alternating current power in the conductor 10 is in one direction, the polarized relay 78 is not operated. However, when the flow of alternating current power in the conductor 10 is reversed, the contact 79 moves into engagement with contact 80 and an indicating lamp 81 is energized from a battery 82. The indicating lamp 81 remains lighted until the polarized relay 78 is returned to the non-operated position.

Referring to FIG. 6, if it is desirable to adjust the phase of the voltage applied to the glow lamp or tube 35 with respect to the voltage of the electric field, a circuit shown generally at 81' and resonant to the frequency of the current flow in the conductor 10 can be used. The circuit 81 includes a variable capacitor 82' connected in series in conductor 33 and an iron core inductor 83 connected across the electrodes 36 and 37. For limiting the voltage applied by the circuit 32 to the time delay means 61 and between the cathode 56 and the gate 57 of the silicon controlled rectifier 54 a voltage limiting resistor 84 is connected between the conductors 58 and 59.

What is claimed as new is:

1. Means responsive to power flow in a conductor in which alternating current flows as a result of alternating voltage applied thereto comprising
   circuit means arranged to be energized from said conductor,
   means for generating flow of direct current in said circuit means in accordance with the combined action of the electric field of said conductor resulting from application of alternating voltage thereto and of the flow of alternating current in said conductor, said direct current flow being in one direction or the other depending upon the phase relation between said electric field and said alternating current, and
   means responsive to said flow of direct current.

2. The power flow responsive means according to claim 1 wherein
   a magnetic circuit is arranged to link said conductor, and
   a winding on said magnetic circuit is connected to said circuit means.

3. The power flow responsive means according to claim 2 wherein
   said magnetic circuit includes an air gap for relative movement of said conductor and a magnetic member for shunting said air gap and surrounding said conductor, and
   means attached to said magnetic circuit for manipulating it relative to said conductor by a live line tool.

4. The power flow responsive means according to claim 3 wherein
   a spring biases said magnetic member to shunting position, and
   said magnetic member has an extension for engaging said conductor to open said magnetic member against the biasing action of said spring.

5. The power flow responsive means according to claim 4 wherein means encapsulate a portion of said magnetic circuit and said winding.

6. The power flow responsive means according to claim 2 wherein voltage limiting means connected across said circuit means limit the voltage applied thereto by said winding.

7. The power flow responsive means according to claim 1 wherein
   a circuit interrupter is provided for connection in series with said conductor,
   trip means is arranged to open said circuit interrupter, and
   means responsive to said flow of direct current in one direction is arranged to operate said trip means.

8. The power flow responsive means according to claim 7 wherein reversing switch means is arranged to reverse the direction of flow of said direct current to which said trip means is responsive.

9. The power flow responsive means according to claim 7 wherein time delay means prevent operation of said trip means for a predetermined time after said direct current starts to flow in said one direction.

10. The power flow responsive means according to claim 1 wherein said means responsive to said flow of direct current comprises a zero center device that includes a member that is moved to one position when said direct current flow in one direction and is moved to another position when said direct current flow in the opposite direction.

11. The power flow responsive means according to claim 10 wherein means hold said member in at least one of said positions after alternating current ceases to flow in said conductor.

12. The power flow responsive means according to claim 10 wherein
    a contact is arranged in each position to be engaged by said member,
    an indicating device is connected to each contact, and
    circuit means including an electric current source is connected to said member and said indicating devices to energize one or the other of them depending upon the direction of power flow in said conductor.

13. The power flow responsive means according to claim 1 wherein said means responsive to said flow of direct current comprises a polarized relay.

14. Means responsive to power flow in a conductor in which alternating current flows as a result of alternating voltage applied thereto comprising means responsive to power flow in one direction in said conductor, means responsive to power flow in the opposite direction in said conductor, means for applying to said power flow responsive means an alternating voltage corresponding to flow of alternating current in said conductor, and means for applying to said power flow responsive means an alternating voltage corresponding to the electric field of said conductor.

15. The power flow responsive means according to claim 14 wherein said power flow responsive means is mounted in the electric field of said conductor, and said means for applying an alternating voltage corresponding to said flow of alternating current in said conductor includes a magnetic circuit linking said conductor and a winding linking said magnetic circuit and connected across said power flow responsive means.

16. The power flow responsive means according to claim 14 wherein there is a flow of direct current through said power flow responsive means in one direction or the other depending upon the direction of power flow in said conductor, and means are provided responsive to said flow of direct current.

17. The power flow responsive means according to claim 16 wherein a circuit interrupter is provided for connection in series with said conductor, trip means is arranged to open said circuit interrupter, and means responsive to said flow of direct current in one direction is arranged to operate said trip means.

18. The power flow responsive means according to claim 17 wherein reversing switch means is arranged to reverse the direction of flow of said direct current to which said trip means is responsive.

19. The power flow responsive means according to claim 17 wherein time delay means prevent operation of said trip means for a predetermined time after said direct current starts to flow in said one direction.

20. The power flow responsive means according to claim 16 wherein said means responsive to said flow of direct current comprises a zero center device that includes a member that is moved to one position when said direct current flows in one direction and is moved to another position when said direct current flows in the opposite direction.

21. The power flow responsive means according to claim 20 wherein means hold said member in at least one of said positions after alternating current ceases to flow in said conductor.

22. The power flow responsive means according to claim 20 wherein a contact is arranged in each position to be engaged by said member, an indicating device is connected to each contact, and circuit means including an electric current source is connected to said member and said indicating devices to energize one or the other of them depending on the direction of power flow in said conductor.

23. The power flow responsive means according to claim 16 wherein said means responsive to said flow of direct current comprises a polarized relay.

24. The power flow responsive means according to claim 14 wherein means are provided for adjusting the phase of the alternating voltage applied to said power flow responsive means corresponding to flow of alternating current in said conductor with respect to the phase of the alternating voltage corresponding to the electric field of said conductor.

25. Means responsive to power flow in a conductor in which alternating current flows as a result of alternating voltage applied thereto comprising circuit means arranged to be energized from said conductor, means including a pair of electrodes in a glow tube that selectively emit light depending upon the direction of power flow in said conductor for causing a flow of direct current in said circuit means in response to the combined action of the electric field of said conductor resulting from application of alternating voltage thereto and of the flow of alternating current in said conductor, said direct current flow being in one direction or the other depending upon the phase relation between said electric field and said alternating current, and means responsive to said flow of direct current.

26. The power flow responsive means according to claim 25 wherein lens means adjacent said glow tube facilitate visual inspection of said electrodes.

27. Means responsive to power flow in a conductor in which alternating current flows as a result of alternating voltage applied thereto comprising means responsive to power flow in one direction in said conductor, means responsive to power flow in the opposite direction in said conductor, said power flow responsive means including the electrodes of a glow lamp one of which glows when the power flow is in one direction and the other glows when the power flow is in the opposite direction, means for applying to said power flow responsive means an alternating voltage corresponding to flow of alternating current in said conductor, and means for applying to said power flow responsive means as alternating voltage corresponding to the electric field of said conductor.

28. The power flow responsive means according to claim 27 wherein voltage limiting means connected across said electrodes limit the voltage applied thereto as a result of alternating current flow in said conductor.

References Cited

UNITED STATES PATENTS

| 1,669,149 | 5/1928 | Traver | 317—43 X |
| 2,165,290 | 7/1939 | Mitchell | 336—176 X |
| 3,102,988 | 9/1963 | Hoffman | 336—176 |

JAMES D. TRAMMELL, Primary Examiner

U.S. Cl. X.R.

307—127; 317—43; 336—176; 340—248